H. E. BRIDGWATER.
PROCESS AND APPARATUS FOR TREATING TYPE BARS FOR TYPE WRITING AND LIKE MACHINES.
APPLICATION FILED MAY 3, 1918.

1,308,329.

Patented July 1, 1919.
7 SHEETS—SHEET 1.

Fig. 1.

WITNESSES

INVENTOR
Herbert E. Bridgwater
By Jacob Felbel
HIS ATTORNEY

H. E. BRIDGWATER.
PROCESS AND APPARATUS FOR TREATING TYPE BARS FOR TYPE WRITING AND LIKE MACHINES.
APPLICATION FILED MAY 3, 1918.

1,308,329.

Patented July 1, 1919.
7 SHEETS—SHEET 3.

Fig. 5.

WITNESSES
L. Nelson
Charles E. Smith

INVENTOR
Herbert E. Bridgwater
By Jacob Felbel
HIS ATTORNEY H. E. BRIDGWATER.
PROCESS AND APPARATUS FOR TREATING TYPE BARS FOR TYPE WRITING AND LIKE MACHINES.
APPLICATION FILED MAY 3, 1918.

1,308,329.

Patented July 1, 1919.
7 SHEETS—SHEET 5.

WITNESSES
L. Nelson.
Charles R. Smith.

INVENTOR
Herbert E. Bridgwater
By Jacob Felbel
HIS ATTORNEY

H. E. BRIDGWATER.
PROCESS AND APPARATUS FOR TREATING TYPE BARS FOR TYPE WRITING AND LIKE MACHINES.
APPLICATION FILED MAY 3, 1918.

1,308,329.

Patented July 1, 1919.
7 SHEETS—SHEET 6.

WITNESSES

INVENTOR
Herbert E. Bridgwater
By Jacob Felbel
HIS ATTORNEY

UNITED STATES PATENT OFFICE.

HERBERT E. BRIDGWATER, OF SYRACUSE, NEW YORK, ASSIGNOR TO REMINGTON TYPEWRITER COMPANY, OF ILION, NEW YORK, A CORPORATION OF NEW YORK.

PROCESS AND APPARATUS FOR TREATING TYPE-BARS FOR TYPE-WRITING AND LIKE MACHINES.

1,308,329.  Specification of Letters Patent.  Patented July 1, 1919.

Application filed May 3, 1918. Serial No. 232,247.

*To all whom it may concern:*

Be it known that I, HERBERT E. BRIDGWATER, citizen of the United States, and resident of Syracuse, in the county of Onondaga and State of New York, have invented certain new and useful Improvements in Processes and Apparatus for Treating Type-Bars for Type-Writing and like Machines, of which the following is a specification.

My invention relates to a process and apparatus for treating type bars for typewriting and like machines, and more particularly for cutting guide faces or surfaces on such type bars.

Considerable difficulty has been encountered heretofore in providing efficient means for accurately guiding type bars to the printing point without a tendency of the type bars to stick at times in the center guide, as has been fully pointed out in an application filed by me on the 28th day of March, 1918, and bearing Serial No. 225,272 which application is directed to guiding means formed in part by the process and apparatus of the present invention.

The main object of this invention, generally stated, is to provide a process and a simple and efficient device or apparatus by which the type bars or carriers may be quickly and accurately treated in such a manner that they may co-act with a center guide with accuracy and be efficiently guided to the printing point without the type bars being liable to stick in the center guide.

To the above and other ends which will hereinafter appear my invention consists of the process and of the features of construction, arrangements of parts and combinations of devices to be set forth in the following description and particularly pointed out in the appended claims.

In the accompanying drawings wherein like reference characters designate corresponding parts in the different views.

Figure 12:
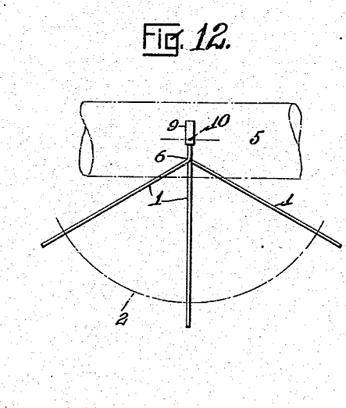
Fig. 12 is a diagrammatic front view showing two extreme side type bars and the center type bar, all as they appear in the printing position.
Figure 14:
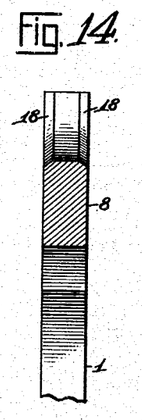
Fig. 14 is a corresponding view of a center type bar.
Figure 15:
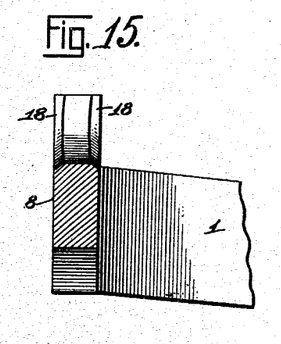
Fig. 15 is a corresponding view of a type bar at the right-hand side of the system.
Figure 16:
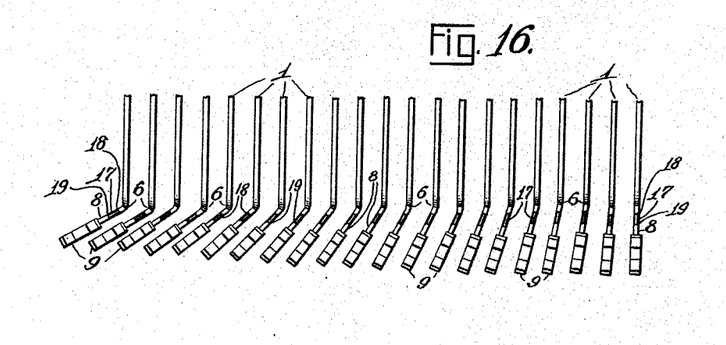
Fig. 16 is a detail view illustrating the forward end portions of the type bars of one-half of the system as they appear in a developed plan.

In order that a clear understanding of the present invention, and the results to be attained thereby, may be arrived at I deem it advisable to show in the accompanying drawings and to make reference herein to features disclosed in my application hereinbefore referred to, such features being shown in Figs. 9 to 18, inclusive. Referring first to these figures it will be understood that in acordance with my present invention a system of type bars, such for example as the type bars 1, are to be treated in order to form guide faces or surfaces thereon. Fig. 16 shows the front end portions of one-half of the system of type bars as they appear in a developed top plan view thereof, it being understood that the other half of the system is the same as that shown, except that the free ends of the bars are bent in the opposite direction. In a typewriting or like machine these type bars are usually, as shown in the present instance, segmentally arranged and mounted on a pivot wire 2 carried by a type bar segment 3, and work in guide slots 4 therein. The type bars are usually thus mounted to move in converging planes through about 90° and in the present instance to move upwardly and rearwardly and strike against the front face of a platen 5. It will be seen more particularly from Figs. 10, 12 and 16 that in the present instance, the type bars at the outer end portions thereof are bent laterally at increasing angles from the center to the sides of the system, the line of the bend in each bar being indicated at 6. The end portion 8 of each bar, intermediate the bend 6 and the free end thereof, carries a type block 9. The portions 8 on all of the bars are brought to the same plane, as indicated in Fig. 12 in order to properly present the types thereon at the printing point indicated at 10. From an inspection of Fig. 12 it will be understood that all of the type bars when in the printing position converge in radial planes at a point corresponding to the line of the bend 6 in each bar, whereas the printing point 10 is beyond or above this point of convergence. There is nothing unusual in the construction of the typewriting machine thus far described, it being an ordinary form of construction, but reference is made thereto in order that what is to follow may be made clear.

Various forms of center guides have been employed in connection with type bars thus arranged but all of which for one reason or another were faulty and open to various objections pointed out in my previously filed application hereinbefore referred to. In accordance with the invention of said application I provide a center guide, designated as a whole by the reference numeral 11 in Figs. 10 and 11. This center guide, as shown, comprises a guide roller 12 having a substantially V-shaped peripheral groove therein, the side walls 13 of the groove forming oppositely beveled or inclined guide faces for coöperation with each of the type bars as will presently appear. The guide roller has coned pivots formed on the ends thereof, said pivots being seated in bearings in a two-part bracket or support. One member 14 of the bracket is secured by screws 15 to the type bar segment 3 or some other suitable point of support, whereas the other member 16 of the bracket is adjustably secured by suitable means to the first mentioned member. In this manner the grooved guide roller is supported in the path of the portion 8 of each type bar with the axis of the roller at right angles to the plane of the portion 8 on each bar as it approaches the printing position. Each bar, as shown, is formed, in the part 8 thereof, with a notch, slot or recess 17 in its front edge, the notch opening at the front and extending for a considerable depth into the metal and from side to side of the bar. This slot or notch is preferably, though not necessarily, formed in the operation of stamping each bar, although the beveled guide surfaces are afterward formed by a separate operation. The position of this slot in each bar is such that the guide roller at its grooved portion may be received therein as shown in Figs. 9, 10, 11 and 17.

When thus positioned the oppositely beveled or inclined guide faces 18 and 19 on the bar co-act with the guide surfaces 13 on the roller, each guide surface on the bar matching the co-acting surface on the roller with a line contact. The faces 18 and 19 being on opposite sides of the axis of the roller prevent an endwise or longitudinal displacement of the bar, or the type carrying end thereof. And the guide surfaces 13 on the roller coöperating with the bar on opposite sides thereof prevent a lateral displacement of the bar at the type carrying end thereof.

It will thus be seen that each type bar is efficiently guided in its printing movement against deflection in two directions at right angles to each other. The surfaces 18 and 19 engage the roller and remain in engagement therewith with line contact at four points throughout a considerable portion of the final movement of the type bar to the printing position and efficiently and accurately guide each bar in a like manner to the printing position.

In order to have the guide surfaces on each type bar co-act with the guide roller in the manner described, each guide surface on each bar is formed on an arc about the pivotal axis of the type bar as a center.

Figure 13:
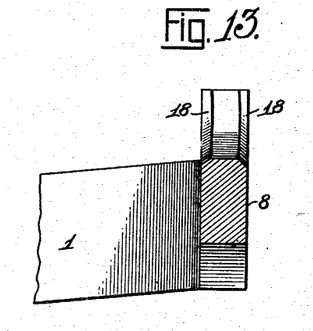
Fig. 13 is an enlarged detail fragmentary sectional view of a type bar at the left-hand side of the system, the section being taken on a line corresponding to the line $w$—$w$ of Fig. 17 and looking in the direction of the arrows at said line and assuming the type bar to be in the printing position.
Figures 17, 18:
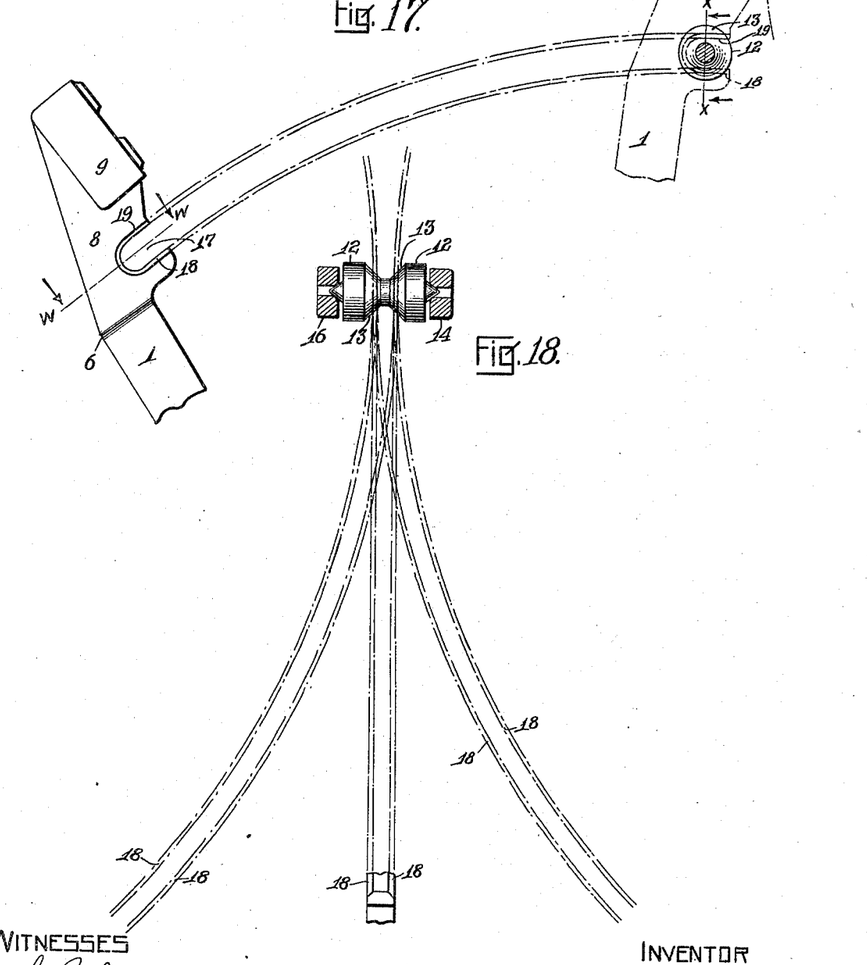
Fig. 17 is an enlarged detail diagrammatic view showing the center type bar, or one near the center, and the center guide roller with which it co-acts.
Fig. 18 is a diagrammatic plan view showing the paths of movement of the contact surfaces on the two extreme side bars of the system and the center bar as viewed from above.

This I have attempted to illustrate in Figs. 13, 14, 15, 17 and 18. While these views are diagrammatic in character, and the proportions are not entirely accurate, said views will nevertheless serve to illustrate the point in question. Referring first to Fig. 17 it will be understood that the type bar shown is supposed to be one at or near the center of the system. It will be observed from the dotted lines extending from the surfaces 18 and 19 that each of these surfaces is formed as an arc, the center of which is the pivotal center of the type bar shown. The guide surfaces are not alike on any two type bars; they differ as the angular relation of each type bar in the system differs from that of all others. Thus in Fig. 18 I have attempted to show in dotted lines an extension of the guide surfaces 18 of, say, the extreme side type bars and the center bar, as the parts are viewed from above. Assuming for the moment that the type bar shown in Fig. 17 is the center bar, and is the same bar that is shown at the center in Fig. 18 then the surfaces 18 would be formed as represented in Figs. 14, 17 and 18, in the arcs shown by the dotted line projections of said surfaces in the two last mentioned figures. As we approach either side of the system of type bars from the center, however, the arc-like formation of a guide surface on each type bar becomes more inclined, the plane thereof conforming to the angular position of the type bar in the system. This I have attempted to show in Fig. 18 in which it will be seen that each of the two extreme type bars of the system as it swings in from a side of the segment, has the guide surfaces 18 formed somewhat as I have attempted to illustrate them by dotted line extensions thereof in Fig. 18. In every instance, however, each of the surfaces 18 and 19 on a type bar, no matter where it may be situated in the system, will be formed on an arc of which the pivot of the type bar is the center. But the relation of the guide surfaces on each type bar to the bar on which they are formed, will vary throughout the system. This I have attempted to illustrate by the exaggerated showing in Figs. 13, 14 and 15 in which the showing in each instance corresponds to a section of the bar taken on the line $w—w$ of Fig. 17 and looking in the direction of the arrows at said line. Moreover, each of Figs. 13, 14 and 15 shows a bar as seen from above and as it would appear in the printing position. Fig. 13 may be taken to represent the extreme left-hand bar; Fig. 14 the center bar; and Fig. 15 the extreme right-hand bar. These bars may be said to represent the extreme differences in the relation of the guide surfaces on the type bars. The inclination of the planes of the arcs on which the surfaces are formed will be gradually less from the sides of the system to the center where the arc is in a vertical plane as indicated in Figs. 14, 17 and 18 and supports for the moment the bar shown in Fig. 17 to be the center bar.

With the guiding surfaces on the type bars formed in this manner such surfaces are capable of accurately fitting and coöperating with the center guide to properly direct each bar to the printing position without undue friction or cramping between any type bar and the center guide, and without liability of any of the bars sticking in the guide. From an inspection of Fig. 9 it will be seen that it is only the guide surfaces 18 and 19 on each bar that co-act with the roller, the surfaces $18^a$ on each bar, and which are formed by the blanking operation, being maintained free from contact with the guide roller at all times.

The use of efficient type bar guiding means of the character shown and described herein is rendered possible by my invention of a process and machine by which the guide surfaces on the type bars are formed and which constitute the subject-matter of the present application. By such process and machine the guide surfaces 18 and 19 on each type bar are cut or formed while the type bar describes a movement corresponding to its printing movement in the type-writing machine and by a tool or cutter which has surfaces that correspond in form and location to the guide surfaces 13 on the center guide. It will be readily understood therefore that while the relation of the guide surfaces 18 and 19 to each type bar differ from those of every other bar, nevertheless, these guide surfaces may be formed in a simple manner with great accuracy and that each type bar may be directed by the guide roller with accuracy to the printing point.

The general objects and purposes to be attained by the process and apparatus of my present invention having been explained I will now describe the construction of the apparatus and the manner of carrying out the process of my invention.

Figure 5:
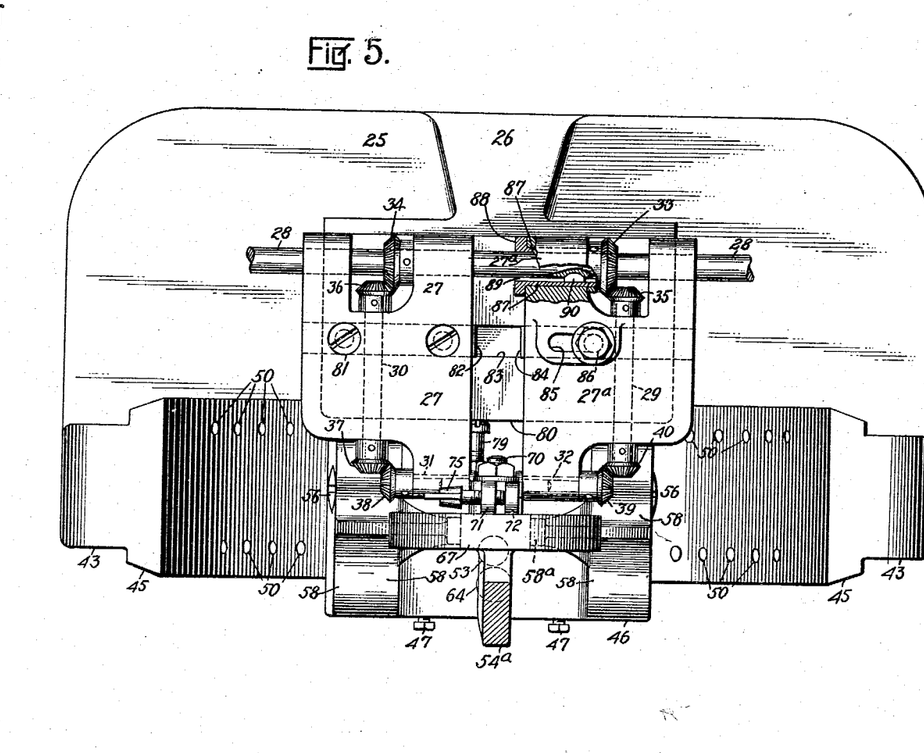
Fig. 5 is a plan view of the machine.

Referring particularly to Figs. 1 to 8, inclusive, which show the apparatus, or "fixture" of my present invention, it will be observed that the apparatus in question comprises a base 25 from which an upwardly and forwardly extending fixed standard or support 26 projects. The upper end of the standard carries heads 27 and $27^a$ having bearings for five shafts 28, 29, 30, 31 and 32, as best shown in Fig. 5. The heads are connected to the standard and may be relatively adjusted thereon by means which will be hereinafter described. The shaft 28 is the main driving shaft and is suitably connected to the source of power. This shaft carries bevel pinions 33 and 34, the former meshing with a bevel pinion 35 on the rear end of the shaft 29, and the latter meshing with a bevel pinion 36 on the rear end of the shaft 30. The forward end of the shaft 30 carries a bevel pinion 37 which meshes with a bevel pinion 38 carried by the shaft 31 which is alined with the shaft 32. The shaft 32 in a like manner carries a bevel pinion 39 which meshes with a corresponding pinion 40 on the forward end of the shaft 29. From an inspection of Fig. 8 it will be understood that the alined shafts 31 and 32 are hollow and form sockets at the inner ends thereof, each adapted to receive and hold a milling or cutting tool 41. These tools are oppositely disposed and have oppositely beveled cutting faces 42 which operate on opposite sides of a type bar 1, as shown, and as will hereinafter more clearly appear. The location of these cutters corresponds to the location of the center guide roller 12 in the typewriting machine, the cutting face 42 of each tool corresponding to a guide surface 13 on the guide roller.

The means by which each type bar is carried up against the cutters will now be described.

Figure 1:
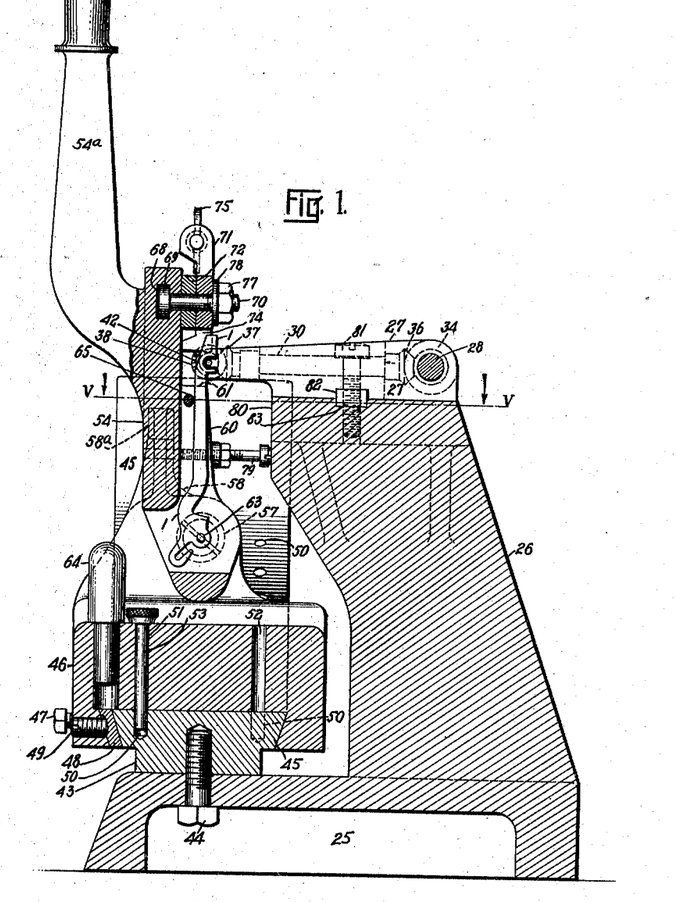
Figure 1 is a vertical fore-and-aft sectional view of one form of machine embodying my invention and by which the process of the present invention may be carried out, the section being taken on the line $u$—$u$ of Fig. 2 and looking in the direction of the arrows at said line.

The main frame, base or support has an upright segment 43 secured thereto, as for example by means of screws 44. The upper edge of the member 43 is formed as a segmental guide 45 which is of dove-tail formation in cross-section, as best shown in Fig. 1. Seated on the segmental dove-tail guide 45 and fitting the same is a support or carrier designated as a whole by the reference numeral 46. The segmental dove-tail recess in the member 46, by which it is seated on the guide 45, enables the member 46 to be adjusted to different positions along the guide and around a center which corresponds to the center of the arc on which the guide is formed and to be adjusted to different angular or radial positions around said center. It will be understood, however, that the member 46 fits snugly on the guide and is held against movement in any other direction. The member 46 may be held securely against movement on the guide 45 by screws 47 threaded into tapped openings in the member 46 and bearing at their inner ends against a segmental gib 48, which latter is held in place, and held normally to a free sliding fit on the guide, by screws 49.

Figures 2, 3, 4:
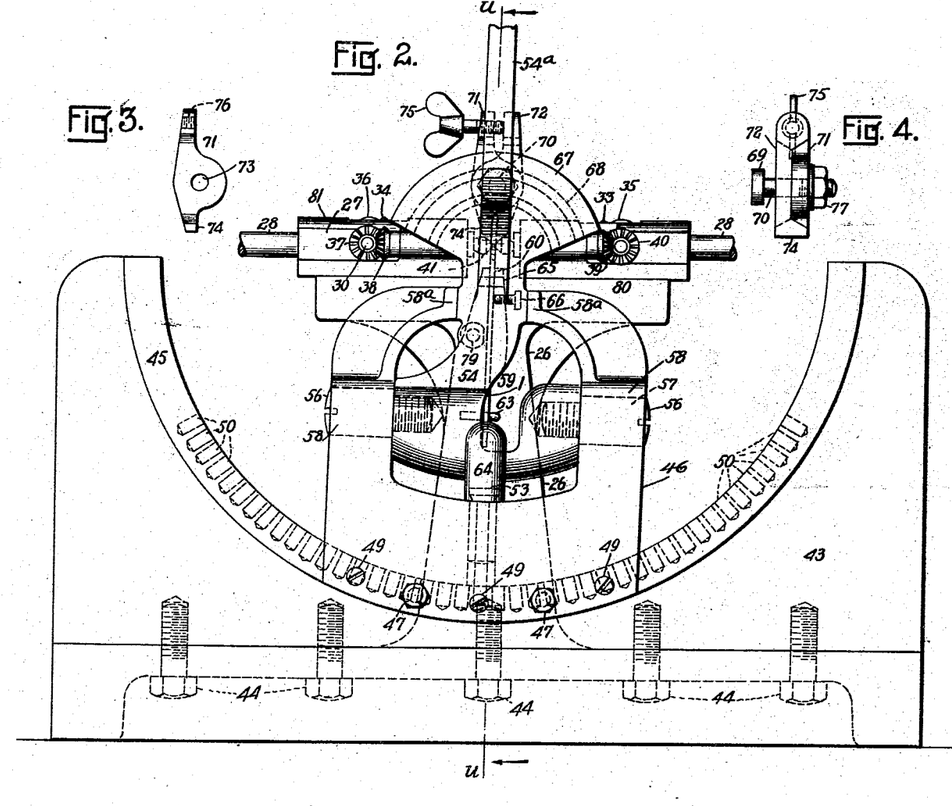
Fig. 2 is a front elevation of the same.
Fig. 3 is a detail face view of one of the members of a two-part type-bar clamp forming part of the apparatus of the machine.
Fig. 4 is a detail edge view of the clamp, shown detached.

From an inspection of Figs. 2 and 5 it will be seen that the upper curved face of the guide 45 is provided with two series or lines of radially disposed openings 50, the openings in one line being staggered with reference to those of the other line as they are viewed from the front of the machine. In the present instance there are forty-two such openings corresponding to the number of type bars usually employed in a typewriting machine. The member 46 has two openings 51 and 52 extending therethrough and arranged in alinement fore and aft of the machine, as best shown in Fig. 1. The opening 52 is adapted to be brought successively into register with the openings 50 of the rear row, whereas the opening 51 is adapted to be brought successively into register with the openings 50 of the front row. A locking pin 53 is adapted to be introduced into either of the openings 51 or 52 and extend through the same into a registering opening 50 in the guide 45. This provides for locking the member 46 and the parts carried thereby in any predetermined one of the forty-two different angular or radial positions to which the member 46 may be set, and enables the operator to readily determine the angular position desired. After the proper radial position has been obtained and the locking pin introduced into one of the openings 50 of the front or rear row, as the case may be, the screws 47 may be threaded in and thus firmly hold the member 46 in the position to which it has been set.

Figure 7:
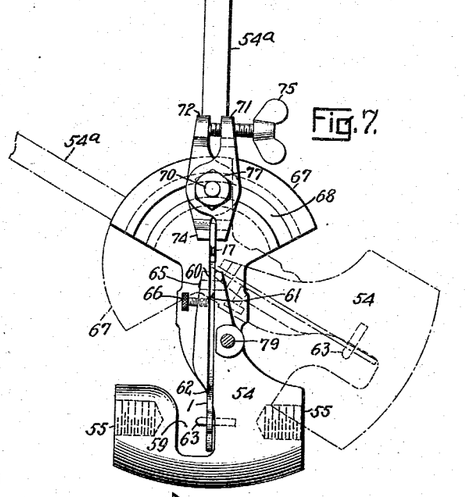
Fig. 7 is a detail rear view of the type bar carrier shown detached and clamping a type bar in place thereon.
Figure 8:
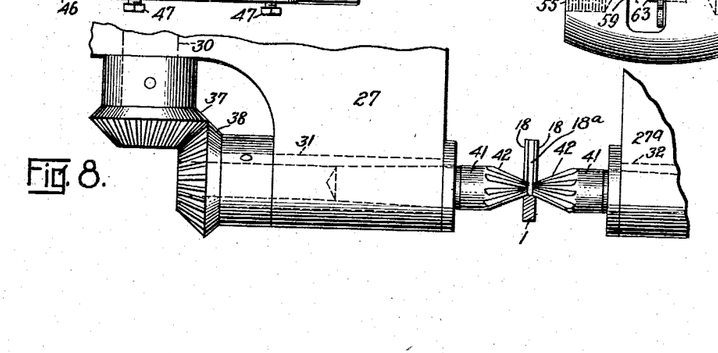
Fig. 8 is a detail fragmentary plan view showing the cutting tools effecting a cutting operation on the type bar, this view being on a larger scale than Fig. 1.
Figures 9, 10, 11:
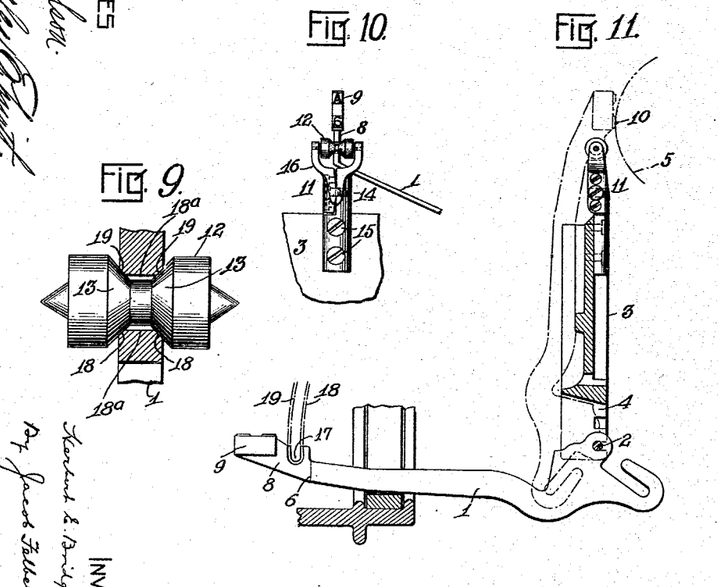
Fig. 9 is an enlarged detail fragmentary sectional view showing the center guide roller and the guide surfaces of the type bar co-acting therewith, the section being taken on a line $x$—$x$ of Fig. 17 and looking in the direction of the arrows at said line.
Fig. 10 is a fragmentary rear view of the center guide showing a side type bar in the printing position.
Fig. 11 is a detail side view partly in section showing a type bar mounted in place on the type bar segment and the center guide which co-acts therewith.

A type bar carrying member, by which each type bar is moved against the cutter, is designated as a whole by the reference numeral 54. This member, which is shown in detail in Fig. 7, is tapped at 55 on opposite sides thereof to receive the threaded ends of pivot screws 56, the head-like bearing portions 57 of said screws being received in bearing openings in standards or arms 58 of the member 46. The carrier is thus pivoted to swing in an arc on the supporting member 46 and in a plane at right angles to the plane of movement of the member 46 on its guide 45, the pivotal axis of the member 54, and the axis around which the member 46 turns being at right angles to each other. A handle 54$^a$ is connected to the carrier and by which it may be swung on its pivots 56.

The arms 58 are extended upwardly and inwardly and form guides and supports 58$^a$ between which the carrier is received when it is moved up into cutting position and by which the carrier is supported on opposite sides.

The lower portion of the carrier 54 is recessed at one side of the median plane thereof as indicated at 59, and the rear face of the carrier has a longitudinally extending type-bar receiving-slot 60 formed therein above the pivotal axis of the carrier. The width of the slot is such that a type bar 1 may be received edgewise therein. The upper end of the slot terminates at 61, whereas the lower end of the slot terminates at 62 so far as the right-hand side wall thereof is concerned, the recess 59 eliminating the lower portion of the right-hand wall of the slot. Carried by the carrier 54 is a type bar positioning pin 63 which projects at its free end into the recess 59 and the axis of which is coincident with the pivotal axis of the carrier 54. This construction is such that when the carrier is swung down and toward the front from the position shown in Fig. 1 to a position where it is arrested and supported by a stop pin 64, a type bar 1 may have its heel introduced into the recess 59, and the pin 63 may be introduced into the pivot opening in the bar by moving the bar into place thereon. The bar may then be turned around the pin 63 and down into the slot 60 until the back of the bar is seated against a fixed pin 65 which extends transversely across the slot, as shown in Fig. 1. From an inspection of Figs. 2 and 7 it will be seen that a thumb screw 66 is received in a tapped opening in one side of the carrier. This screw passes at its free end into the slot 60 and is adapted to bear against a side of the type bar 1 contained in the slot and hold it in fixed position on the carrier.

It is desirable, in addition to means thus far described for holding a type bar on the carrier, to provide means by which the end portion 8 of each type bar may be securely held to the carrier while the cutting is being effected. However, since the angular relation of the part 8 on each type bar is different from that of every other bar of the system, the provision of such holding means presents some difficulty. However, I attain the desired result by simple and efficient means which will now be described.

The carrier 54 has formed on the upper end thereof a segmental portion 67 provided with an undercut segmental groove 68 struck from the same center as the segmental guide 45. The head 69 of a bolt 70 is received beneath the undercut walls of the groove while the stem of the bolt passes rearwardly therethrough. This bolt passes through openings in the members of a two-part type bar clamp best shown in Figs. 1, 3, 4 and 7, Fig. 4 being a detail thereof. This clamp comprises two members 71 and 72 each apertured as shown at 73 in Fig. 3 to receive and pivot on the bolt 70. Each member has an overlapping clamping jaw 74 at one end, the other end being extended for coöperation with a thumb screw 75. Thus the stem of this screw is received in a tapped opening 76 in the member 71 and bears at its inner end against the upper end of the member 72. By threading the screw in, the upper ends of the members 71 and 72 will be separated and the clamping jaws thereof will be forced to grasp the upper end of a type bar 1, as shown in Figs. 2 and 7, it being understood that at the time a type block has not been placed on the bar. As shown in Fig. 1 the outer end of the bolt 70 is threaded to receive a nut 77, a washer 78 being interposed between the nut and clamp. By tightening this nut the clamp may be held in any position to which it may be adjusted on the segment 67 and along the arc-like guide thereof.

From a consideration of Fig. 7 it will be understood that the line of the bend 6 in each type bar, when the latter is carried to the cutting position, is coincident with the center of the groove 68 along which the clamp may be adjusted, and is likewise coincident with the center around which the member 46 may be adjusted on the guide 45. It follows therefore that no matter at what angle the end portion 8 of the bar is to the body portion thereof, the clamp may always be adjusted to properly engage it. It will also be understood from a consideration of this same figure that whatever may be the angular disposition of the carrier 54, by reason of the setting of member 46 on the guide 45, the part 8 on each type bar will be brought to the same vertical plane when moved to the cutter, as the type bars are when brought to the guide in the typewriting machine. Of course the foregoing is true assuming, as I have, that the type bar introduced into the carrier corresponds to the angular or radial plane to which the carrier had been adjusted or vice versa. This will be clearly understood from a consideration of the parts as they are shown in full and in dotted lines in Fig. 7. Therefore, the clamp is always maintained vertically disposed, as shown, at the cutting operation, whether the carrier moves in a vertical plane, as shown in full lines, for cutting the center bar, or moves in an inclined plane for cutting a side bar, as indicated in dotted lines.

It has previously been explained that the positioning pin 63 has its axis coincident with the pivotal center of the member 54 so that in the movement of the carrier to cutting position the type bar will turn on its own center as it does in the typewriting machine. It has also been explained that the type bar carrier swings toward and away from the cutting tool. The extent of this movement is unimportant so long as the movement of the type bar carried thereby has a path which corresponds to the path of movement it has in the typewriting machine in moving toward and away from the center guide. This movement of the carrier is limited in one direction by the pin 64 and is limited in the opposite direction by a set screw 79 threaded into a tapped opening in the carrier and adapted to coact with a face 80 on the standard 26, whatever may be the radial position of the carrier with the member 46. The movement of the carrier toward the cutters is preferably sufficient to bring the type bar slightly beyond what would correspond to the printing position of the bar in the typewriting machine. This is done so that no portion of the walls at the bottom or inner end of the slot 17 in the bar will seat against the guide roller. It has been pointed out that the type bar carrier is adjusted with the member 46 to different converging planes, of which a bend 6 in the type bar is the center or point of convergence when the bar with the carrier is in position to effect a cutting operation. This point around which the member 46 is adjusted therefore corresponds to the point of convergence of the type bars in the typewriting machine. Each of the openings 50, as has been explained, corresponds to the position of a converging plane of movement of a type bar in the typewriting machine, the angular distance of an opening 50 in one row to the next opening 50 in the other row according with the angular distance between adjacent type bars in the typewriting machine. The construction is such therefore that each type bar will move in the identical radial plane that it moves in when operating in the typewriting machine, each position of adjustment corresponding to one of such bars. Therefore, the movement of each type bar with its carrier from the normal to the cutting position (the latter being shown in Fig. 1) corresponds exactly to the path of printing movement that the same bar has in the typewriting machine. As each type bar moves with its carrier to the cutting position the corners of the slot 17 in the bar are milled off to form the guide surfaces 18 and 19 in exact correspondence with the guide surfaces 13 of the guide roller, as the two co-act with a line contact. Each part of each surface 18 and 19 therefore accurately fits the co-acting guide surface on the roller throughout its engagement therewith.

Figure 6:
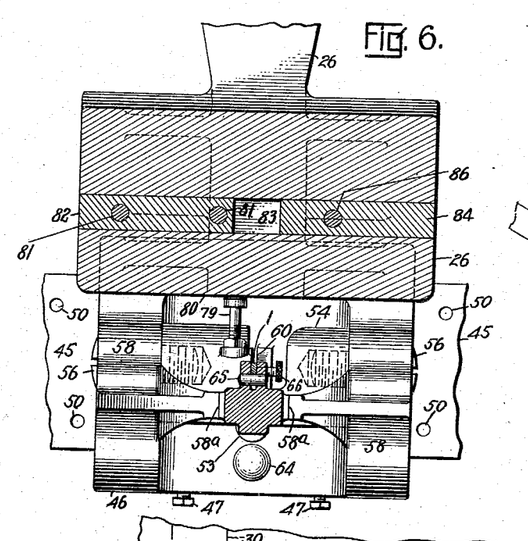
Fig. 6 is a fragmentary detail sectional view taken on a line $v$—$v$ of Fig. 1 and looking in the direction of the arrows at said line.

I have hereinbefore explained that the heads 27 and 27$^a$, together with the cutters 41 carried thereby, are mounted for relative adjustment on the standard 26. Any suitable means may be employed for this purpose. The means disclosed in the present instance are best known in Figs. 5 and 6, from which it will be seen that the head 27 is fixedly secured to the standard 26 by screws 81. A feather or key 82 is seated in a slot in the head and also in a slot 83 in the standard, as shown in Figs. 1, 5 and 6, thus maintaining the head in proper alinement. A corresponding key 84 maintains the head 27$^a$ in proper alinement. This head, however, is mounted for adjustment longitudinally of the key and toward and away from the head 27. Thus a slot 85 is formed in the head 27$^a$ and through this slot passes the stem of a headed screw 86 which is received in a tapped opening in the standard and is effective to clamp the head 27$^a$ in the position to which it may be adjusted.

In order that the driving shaft 28 and bevel gear 33 may not interfere with this adjustment of the head 27$^a$, I connect said gear to the shaft with a spline so as to afford a movement of the gear along the shaft with the head 27$^a$ and yet maintain a driving connection between the shaft and gear in all of the adjustments of the latter. Thus from Fig. 5 it will be seen that the hub of the gear 33 is secured to a sleeve 87 which turns in a bearing in the head 27$^a$ and surrounds the shaft 28 and is free to slide thereon. The inner end of this sleeve extends beyond the bearing and is formed with a collar 88. The sleeve 87 has a longitudinally extending spline groove or way 89 formed therein throughout the entire length thereof. A spline 90 is fixed to the shaft 28 and is received in the way 89 to connect the sleeve 87 and gear 33 to turn with the shaft but enable them to be moved along the latter when the head 27$^a$ is adjusted. The means described enable the parts to be assembled and provide for a relative adjustment between the cutters 41.

I have described with considerable detail one form of center guide and the surfaces on the type bars which coact with that particular guide, and also have disclosed a process and machine by which such guide surfaces on the type bars are formed. It should be understood, however, that this is for the purpose of illustrating but one of the many forms in which my invention may be clothed. I am aware that many widely divergent forms of guide constructions may be used to attain the same results as those shown and described, and that the guide surfaces on the type bars or carriers in such constructions may be produced by a process and machine which are within the spirit and scope of the present invention. It should be understood, therefore, that from certain aspects of my invention various changes in the process and machine may be made without departing from my invention as defined by the appended claims. I am aware for example that various forms of cutting tools may be employed; that such tool or tools may have various forms of cutting surfaces depending on the character of the center guide employed; and that such cutting surfaces may be provided on a single tool or on a plurality of separate and distinct tools. From certain aspects of my invention these points may be immaterial as long as the essential results are attained. According to my invention, the guiding surfaces on each type bar are cut by a cutter whose cutting surface corresponds in form to the corresponding surface of the stationary guide in the typewriting machine; and in the cutting operation, each type bar has the same relation to said cutter, both as to angular position and as to the distance of said cutter from the pivot of the type bar, that that particular type bar is to have, in the typewriting machine, to the guide. These relative positions of the type bar and cutter, and their relative motions to produce the correct cut, can, of course, be brought about by apparatus differing considerably in detail and arrangement from the specific apparatus shown in the drawing.

Moreover, it is to be understood that from certain aspects of my invention some features of the machine may be employed without others and that process and machine are not to be confined to cutting guide surfaces on type bars or carriers, but may be employed wherever available in treating such bars.

What I claim as new and desire to secure by Letters Patent, is:

1. The process of forming guiding surfaces on type bars of typewriting and like machines and in which the relation of each guide surface to its bar differs from that of every other bar, which process consists in cutting the guiding surface on each bar by moving the bar against a cutting tool or tools and causing the bar during such movement to receive the same movement which is given it in its printing operation in the typewriting or like machine in which the bar is to be used.

2. The process of formng guiding surfaces on type bars of typewriting and like machines and in which the relation of each guide surface to its bar differs from that of every other bar, which process consists in cutting the guiding surface on each bar by moving the bar against a cutting tool or tools and causing the bar during such movement to receive the same movement which is given it in its printing operation in the typewriting or like machine in which the bar is to be used, the cutting tool or tools being located at a point which corresponds to the position of the co-acting center guide in the typewriting or like machine.

3. The process of forming guiding surfaces on type bars of typewriting and like machines, which process consists in cutting the guiding surface on each bar by moving the bar against a cutting tool shaped substantially to conform to a guide surface which co-acts with the bar and causing the bar during such movement to receive the same movement which is given it in its printing operation in the typewriting machine.

4. The process of forming guiding surfaces on pivoted converging type bars of typewriting and like machines and on that portion of each bar which is intermediate its point of convergence and the free end thereof, said process consisting in swinging each bar around a center corresponding to its pivot in the typewriting or like machine in which the bar is to be used and against a cutting tool or tools located at a point corresponding to the position of a center guide which co-acts with each type bar intermediate its point of convergence and the free end thereof.

5. The process of forming guiding surfaces on pivoted converging type bars of typewriting and like machines and on that portion of each bar which is intermediate its point of convergence and the free end thereof, said process consisting in swinging each bar around a center corresponding to its pivot in the typewriting or like machine in which the bar is to be used and against a cutting tool or tools located at a point corresponding to the position of a center guide which co-acts with each type bar intermediate its point of convergence and the free end thereof to form a guiding surface which in coöperation with a center guide prevents longitudinal as well as lateral deflection of each type bar.

6. The process of forming guiding surfaces on type bars of typewriting and like machines, said process consisting in moving each type bar in a path which corresponds to its printing movement in the typewriting or like machine in which the bar is to be used and bringing each type bar during such movement against a cutting tool, the cutting surface of which conforms to the shape of a guiding surface of the guide with which each type bar co-acts, so that the relation of a guiding surface on each bar to its bar differs from that of every other bar.

7. The process of forming guide surfaces on the free end portions of pivoted type bars of typewriting and like machines, and on those portions thereof where they are bent at increasing angles from the center to the sides of the system, which process consists in swinging each type bar around a center corresponding to its pivot in the typewriting or like machine in which the bar is to be used and against a cutting tool located at a point corresponding to the position of a center guide which, in the typewriting or like machine, co-acts with the type bars between the bends and the free ends thereof.

8. The process of forming guide surfaces on a series of type bars which converge near the printing point and on a portion of each type bar intermediate its points of convergence and the free end thereof, which process consists of swinging each type bar around a center that corresponds to its pivotal center in the typewriting or like machine in which the bar is to be used and against a cutting tool located at a point that corresponds to the position of a center guide with which said type bars co-act in the typewriting or like machine and by which tool there is formed on each bar a guiding surface that extends transversely thereof.

9. The process of forming oppositely beveled guiding surfaces on opposite sides of each type bar of typewriting or like machines, said process consisting in moving each type bar in a path which corresponds to its printing movement in the typewriting or like machine in which the bars are to be used and bringing each type bar during such movement against oppositely beveled cutting surfaces of a cutting tool or tools.

10. The process of forming oppositely beveled guiding surfaces on opposite sides of each type bar of typewriting or like machines, said process consisting in moving each type bar in a path which corresponds to its printing movement in the typewriting or like machine in which the bars are to be used and bringing each type bar during such movement against oppositely beveled cutting surfaces of a cutting tool or tools located in a position which corresponds to the location of a center guide with which the type bars are to co-act in the typewriting or like machine.

11. The process of forming guiding surfaces on type bars of typewriting and like machines which consists in first forming a slot in the front edge of each bar, said slot extending from side to side of the bar and in then beveling off the corners of the walls of such slot, said beveling being effected by moving each type bar in a path which corresponds to its printing movement in the typewriting or like machine in which the bars are to be used and bringing each type bar during such movement against oppositely beveled cutting surfaces of a cutting tool or tools.

12. A device of the character described comprising a type bar carrier mounted for movement to different converging planes corresponding to the converging planes of movement that the type bars have in the machine in which they are to be used and mounted also for movement in each of said planes to correspond to the printing movement of each type bar.

13. A device of the character described comprising a type bar carrier mounted to turn around a center which corresponds to the point of convergence of the type bars in the machine in which they are to be employed and mounted also for movement around a center which corresponds to the pivotal center of the type bar.

14. A device of the character described comprising a type bar carrier mounted for movement to different converging planes corresponding to the converging planes of movement that the type bars have in the machine in which they are to be used and mounted also for movement in each of said planes to correspond to the printing movement of each type bar, and a cutter mounted in the path of the type bar carried by said carrier when the latter receives the last mentioned movement.

15. A device of the character described comprising a type bar carrier mounted to turn around a center which corresponds to the point of convergence of the type bars in the machine in which they are to be employed and mounted also for movement around a center which corresponds to the pivotal center of a type bar, and a cutter mounted at a point beyond said first mentioned center and in the path of a type bar carried by the carrier in its last mentioned movement.

16. A device of the character described comprising a type bar carrier mounted to turn around a center which corresponds to the point of convergence of the type bars in the machine in which they are to be employed and mounted also for movement around a center which corresponds to the pivotal center of a type bar, and means for detachably fixing a type bar to said carrier and with the pivotal center of the type bar coincident with the last mentioned center of the carrier.

17. A device of the character described comprising a type bar carrier mounted to turn around a center which corresponds to the point of convergence of the type bars in the machine in which they are to be employed and mounted also for movement around a center which corresponds to the pivotal center of a type bar, and means for detachably fixing a type bar to said carrier, said means including a type bar clamp adjustable on said carrier around said first mentioned center.

18. A device of the character described comprising a type bar carrier mounted to turn around a center which corresponds to the point of convergence of the type bars in the machine in which they are to be employed and mounted also for movement around a center which corresponds to the pivotal center of a type bar, means for detachably fixing a type bar to said carrier, said means including a type bar clamp adjustable on said carrier around said first mentioned center, and means for securing the clamp in the position to which it may be adjusted on said carrier.

19. A device of the character described comprising a type bar carrier mounted for movement to different converging planes corresponding to the converging planes of movement that the type bars have in the machine in which they are to be used and mounted also for movement in each of said planes to correspond to the printing movement of each type bar, and means for locking the carrier against displacement from the plane to which it may be moved or adjusted.

20. A device of the character described comprising a type bar carrier mounted to turn around a center which corresponds to the point of convergence of the type bars in the machine in which they are to be employed and mounted also for movement around a center which corresponds to the pivotal center of a type bar; and means for detachably fixing a type bar to said carrier, said means including a type bar clamp carried by the carrier, and means which enable said clamp to be maintained always in a single plane notwithstanding the adjustment of the carrier to different planes around said first mentioned center.

21. A device of the character described comprising a support, a carrying member mounted to turn on said support around a center which corresponds to the point of convergence of the type bars in the typewriting or like machine in which the type bars treated are to be used, and a type bar carrying member pivoted to said first mentioned carrying member at a distance from the pivotal center of the latter which corresponds to the length of a type bar between its pivot and point of convergence.

22. In a machine for treating type bars which, in the machine in which they are to be used, have a point of convergence, the combination of a support, two pivotally connected members mounted on said support for circular movement together, the axis of such circular movement and the axis of the pivot that connects said members being perpendicular to each other and situated a distance apart equal to the length of a type bar from its pivot to its said point of convergence.

23. In a machine for treating type bars which, in the machine in which they are to be used, have a point of convergence, the combination of a support, two pivotally connected members mounted on said support for circular movement together, the axis of such circular movement and the axis of the pivot that connects said members being perpendicular to each other and situated a distance apart equal to the length of a type bar from its pivot to its said point of convergence, and means for determining a position of said members on said support corresponding angularly to the position of a type bar in said machine.

24. In a machine for treating type bars which, in the machine in which they are to be used, have a point of convergence, the combination of a support, two pivotally connected members mounted on said support for circular movement together, the axis of such circular movement and the axis of the pivot that connects said members being perpendicular to each other and situated a distance apart equal to the length of a type bar from its pivot to its said point of convergence, and means for holding said members on said support in predetermined angular positions corresponding to the angular positions of the several type bars in said machine.

25. An apparatus for treating type bars that have a point of convergence in the typewriting or like machine in which they are to be employed, said apparatus comprising a cutter, a type bar carrier, and means for affording relative angular adjustments between said carrier and cutter around an axis that corresponds to said point of convergence.

26. A device of the character described comprising a type bar carrier mounted for movement to different converging planes corresponding to the converging planes of movement that the type bars have in the machine in which they are to be used and mounted also for movement in each of said planes to correspond to the printing movement of each type bar, holding means carried by said carrier and coöperative with the outer end portion of a type bar on the carrier, and means which enable said holding means to properly engage a type bar irrespective of the angular disposition of the laterally bent end portion thereof to the body of the bar.

27. A device of the character described comprising a type bar carrier mounted to turn around a center which corresponds to the point of convergence of the type bars in the machine in which they are to be employed and mounted also for movement around a center which corresponds to the pivotal center of a type bar, an arc-shaped guide carried by said carrier and the center of which is coincident with said first named center, and a type bar clamp coöperative with the outer end portion of a type bar, said clamp being carried by and adjustable along said arc-shaped guide.

28. A device of the character described comprising a type bar carrier mounted to turn around a center which corresponds to the point of convergence of the type bars in the machine in which they are to be employed and mounted also for movement around a center which corresponds to the pivotal center of a type bar, and means for holding a type bar in proper relation to its carrier, said holding means including a pin the axis of which is coincident with said last mentioned center and which is adapted to be received in the pivot opening in a type bar.

29. A device of the character described comprising a support, a carrying member mounted to turn on said support around a center which corresponds to the point of convergence of the system of type bars in the typewriting or like machine in which the type bars treated are to be used, a type bar carrying member pivoted to said first mentioned carrying member at a distance from the pivotal center of the latter which corresponds to the length of a type bar between its pivot and point of convergence, and means carried by said type bar carrying member for detachably securing a type bar in place thereon, the same including a clamping device adapted to engage a type bar and mounted for adjustment around said first named center.

30. A device of the character described comprising a type bar carrier mounted to turn around a center which corresponds to the point of convergence of the type bars in the machine in which they are to be employed and mounted also for movement around a center which corresponds to the pivotal center of a type bar, and means for holding a type bar on and in proper relation to said carrier, said holding means including a clamp adapted to engage the outer end of a type bar and mounted for adjustment around said first mentioned center, and a pin the axis of which is coincident with the second mentioned center and which is adapted to be received in the pivot opening in a type bar.

31. A device of the character specified comprising a support; a supporting member mounted for angular movement on said support; a type bar carrying member pivoted to said supporting member to swing in a plane at right angles to the plane of movement of the supporting member, the distance between the center of movement of the supporting member and the pivotal center at which the two members are connected corresponding to the length of a type bar between its pivot and point of convergence with other type bars in the machine in which it is to be used; means for detachably holding a type bar on said type bar carrying member, the same including means for engaging the outer end portion of a type bar, and means which enable said holding means to properly engage a type bar irrespective of the angular disposition of the laterally bent end portion thereof to the body of the bar; and means for holding said supporting member on its support in as many positions as there are type bars in the system, so that in each of said positions a type bar may turn with the type carrying member in the exact path in which the type bar moves in the typewriting machine.

32. A machine of the character specified comprising a type bar carrier mounted to move in an arc and mounted also for movement in converging planes at right angles to the plane of said arc; and holding means for detachably securing a type bar to said carrier, said holding means including a type bar engaging device, and means whereby said engaging device may always be moved to the same plane irrespective of the converging plane in which the carrier is moved.

33. A machine of the character specified comprising a type bar carrier mounted to move in an arc and mounted also for movement in converging planes at right angles to the plane of said arc; and holding means for detachably securing a type bar to said carrier, said holding means including a type bar engaging device, means whereby said engaging device may always be moved to the same plane irrespective of the converging plane in which the carrier is moved, and a positioning pin adapted to be received in a pivot opening in a type bar and the axis of which is coincident with the axis of the carrier in its movement in a converging plane.

34. A machine of the character specified comprising a type bar carrier mounted to move in an arc and mounted also for movement in converging planes at right angles to the plane of said arc, and means for holding the carrier against accidental displacement from the converging plane to which it may be moved or adjusted.

Signed at Syracuse, in the county of Onondaga and State of New York, this 29th day of Apr., A. D. 1918.

HERBERT E. BRIDGWATER.

Witnesses:
 ERNEST B. BISHOP,
 MEAD HEDGLAN.

Copies of this patent may be obtained for five cents each, by addressing the "Commissioner of Patents, Washington, D. C."